Sept. 10, 1935.  E. EGER  2,014,129
INNER TUBE
Filed July 9, 1932  2 Sheets-Sheet 1

INVENTOR
ERNST EGER
BY Walter L. Pipes
ATTORNEY

Sept. 10, 1935.     E. EGER     2,014,129
INNER TUBE
Filed July 9, 1932     2 Sheets-Sheet 2
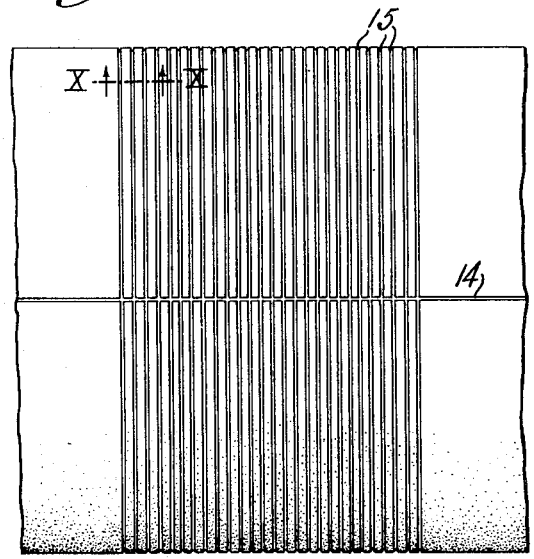
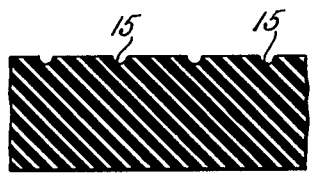
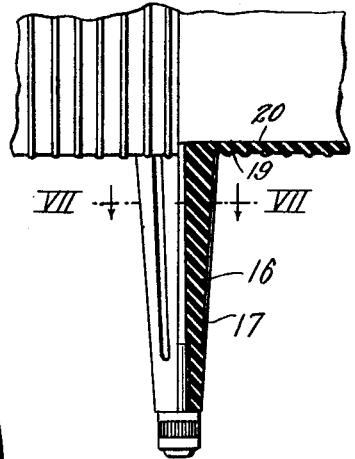
INVENTOR
ERNST EGER
BY Walter L. Piper
ATTORNEY Patented Sept. 10, 1935

2,014,129

UNITED STATES PATENT OFFICE 2,014,129

INNER TUBE

Ernst Eger, Grosse Pointe Park, Mich., assignor, by mesne assignments, to United States Rubber Company, New York, N. Y., a corporation of New Jersey Application July 9, 1932, Serial No. 621,587

20 Claims. (Cl. 152—13)

This application is a substitute application for my application Serial No. 579,200, filed December 5, 1931.

My invention relates to inner tubes for automobile tires, and more particularly to inner tubes for automobile tires having corrugated or irregular outer surfaces to permit the escape of air from between the surfaces of the tubes and the enclosing automobile tires or casings.

In assembling and inflating an automobile tire it frequently happens that quantities of air are entrapped between the outer circumference of the inner tube and the enclosing casing by reason of the tight engagement between the surfaces of the inner tube and the side walls of the casing. There is a tendency for the inner tube and the bead portions of the tire to form airtight seals during the inflation of the tire so as to trap air between the surfaces of the inner tube and the casing at the crown region of the tire. This condition is frequently met where drop center rims are used and the inner tube extends radially inwardly of the toes or beads of the tire. In such cases there is a considerable pressure exerted between the toes or beads of the casing and the inner tube which forms a seal against the escape of the air at the outer portions of the casing. Upon the assembly and/or inflating of a tire the operator is not aware of the existence of trapped air in the casing. In some cases the trapped air leaks through the seal and escapes at the valve stem opening in the rim and/or around the outside bead surfaces of the tire. In such cases a newly assembled tire which at first appears to be properly inflated shortly becomes underinflated without the knowledge of the operator and the tire is driven in an underinflated condition with the usual detrimental effects to the tire carcass.

In other cases the trapped air becomes locked in the pockets which hold the inner tube away from contact with the tire casing. Such pockets may persist, although the tire is driven for hundreds of miles. A sharp blow or impact to the tire in the region of such an air pocket tends to loosen the carcass construction, and the air from the pocket seeps through the cords and comes to rest between the carcass and the tread or side wall rubber. This forms a swelling or blister visible on the outside of the tire. The presence of the air between the fabric of the casing and the outer rubber layers causes a separation of the rubber from the carcass. The loosened rubber is easily cut or torn from the tire during use, whereupon the fabric and/or cords of the tire are exposed to the deteriorating effect of the weather and dirt.

In cases where tire carcasses are not impervious, the trapped air permeates into the carcass causing ply and tread separation. Sometimes this permeation takes place as soon as the tire is inflated and in other cases the air remains confined in the pocket until the tire is subject to flexing action, as in running operation. In either event the escape of the air tends to deteriorate the tire.

In order to prevent the formation of such air pockets, manufacturers have been piercing the side walls and treads of tires. Such piercing operations, however, form small openings in the tire carcass which expose the fabric to the action of the weather and dirt. This is particularly objectionable, as water entering such openings tends to deteriorate the fabric or cords in the carcass. Also the piercing operation increases the cost of the tires. Further, the piercing operation does not present a positive means of air escape, as frequently the tube itself will seal over the pierced portion and prevent escape of air that might be trapped in other portions of the casing.

I propose to eliminate the formation of air pockets by slightly roughening or corrugating the outer surface of the inner tube so that when the outer surface of the inner tube engages the inner surface of the casing small passageways are formed leading from the crown region of the tire to the rim area. These passageways preferably extend circumferentially and transversely of the inner tube. The transverse passageways may be confined to the region of the valve stem if the circumferential passageways extend completely around the tube. The transverse passageways prevent sealing of the inner tube and the casing at the regions of the side walls of the tire. The depths of the passageways are so small that their presence does not materially increase or decrease the strength, thickness or flexibility of the tube walls. Stated in another way, the presence of the passageways does not materially alter the strength, thickness or flexibility of the inner tube from those which the same tube would have were the passageways omitted.

The accompanying drawings illustrate certain preferred embodiments of the invention, in which Figure 1 is a side view of an inner tube embodying my invention;

Fig. 5 is a cross sectional view of a tire showing a partially inflated inner tube;

Fig. 6 is a cross sectional view partially in elevation and partially in section of a portion of a tube showing a modified form of valve stem;

Fig. 7 is a cross sectional view of the valve stem shown in Fig. 6 taken substantially along the section line VII—VII of Fig. 6;

Fig. 9 is an outer edge view of a portion of the tube illustrated in Fig. 8; and Fig. 10 is a cross sectional view of a portion of the tube taken substantially along the section line X—X of Fig. 9.

Figure 1:
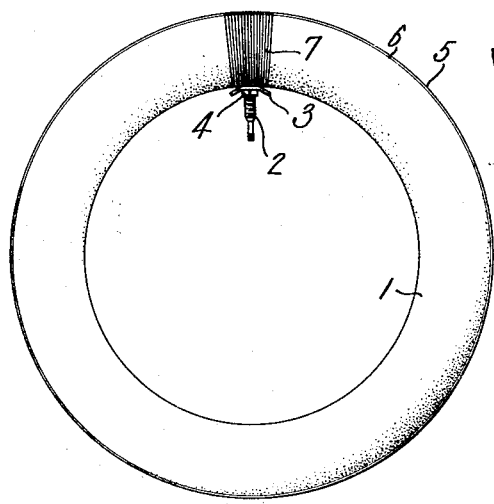

Referring to Figs. 1 to 4, inclusive, an inner tube 1 having the usual valve stem 2, bridge washer 3 and clamping nut 4 is provided with a corrugated or roughened outer surface comprising a central circumferentially extending rib 5, lateral circumferentially extending ribs 6 and transverse or encircling ribs 7. The ribs 5, 6 and 7 constitute a roughened surface when in engagement with the inner surface of the tire casing 8 so that circumferentially and transversely extending air passageways are formed which prevent trapping of air at the crown portion 9 of a tire between the outer surface of the inner tube 1 and the inner surface of the casing 8.

The rib 5 need not be very high. In fact the flash rib formed between the mold sections during the molding of a tire is sufficiently high for the purpose of this invention. Heretofore such flash ribs have been removed from the inner tubes. The flash ribs vary in accordance with the condition of a mold from practically zero to approximately .025 of an inch.

The transverse ribs 7 may be lower than the circumferential ribs 5 and 6 in order to permit the circumferential movement of air along the ribs 5 and 6 and over the tops of the ribs 7. The ribs 7 extend downwardly and past the toe or bead portions 10 of a tire so that the crown region of a tire cannot be sealed from the inner portion 11 when the tire and tube are mounted on a rim 12. The rim 12 is illustrated as a drop center rim, although the invention is applicable to other types of rims.

While the transverse ribs 7 may be applied over the entire surface of the tire 1, satisfactory results are obtained if the ribs are confined to that portion of the tire adjacent the valve stem 2. The valve stem 2 passes through the usual opening 13 in the rim 12. The bridge washer 3 and clamping nut 4 define a pocket at the opening 13 in which the air moving along the transverse ribs 7 is collected. The fit between the usual metal valve stem 2 and the opening 13 is sufficiently loose to permit the escape of air during the inflation of the tire.

By way of an illustration of the invention, and not by way of a limitation thereof, certain mathematical values for rib heights are given. These values are for a 4.75-19 inner tube. The average wall thickness of such a tube is approximately .055 of an inch. Assuming the height of the central circumferential rib 5 to be .025 of an inch, then the lateral ribs 6 may be given the same or a slightly less height. The transverse ribs 7 should be at least .010 of an inch while a height of .015 of an inch gives satisfactory results. A spacing of from 1/16 to 1/8 of an inch between the ribs 7 also gives satisfactory results. The heights of these ribs are subject to some variations as the wearing of the molds or the presence of dirt in the mold grooves causes variations in these heights. The presence of such ribs and passageways on an inner tube does not interfere with or materially alter the strength, thickness or flexibility of the inner tube over the corresponding characteristics of a similar tube not having venting passageways. The heights of the ribs can be increased over the values previously given up to a point where they interfere with other characteristics of the inner tube. The maximum heights of such ribs are not of as great importance as the minimum heights for the reason that the purposes of this invention are accomplished with ribs of sufficient height to form passageways leading from the crown portion 9 to the venting opening 13.

Figure 3:
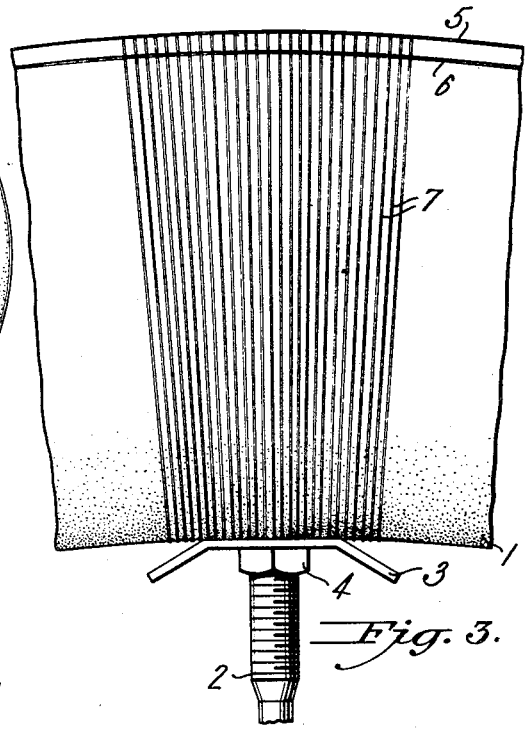
Fig. 3 is an enlarged side elevational view of a portion of the tube illustrating the ribs and passageways.
Figure 2:
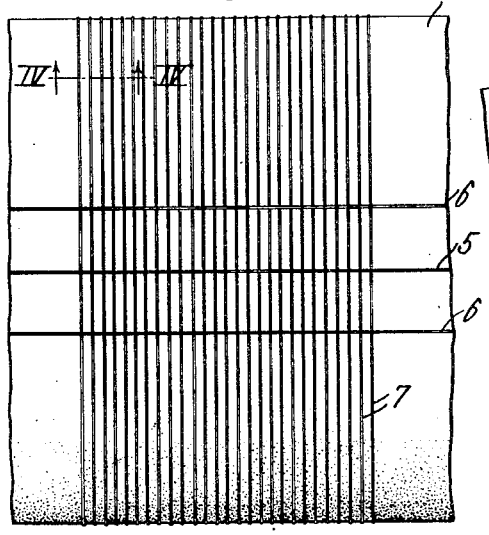
Fig. 2 is an outer edge view of a portion of the inner tube showing both circumferential and transverse ribs forming passageways.
Figure 8:
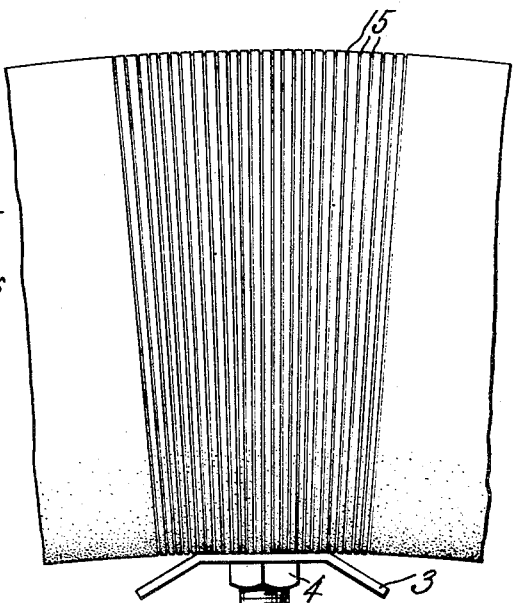
Fig. 8 is a view, similar to Fig. 3, showing a portion of an inner tube provided with depressions forming passageways.
Figure 4:
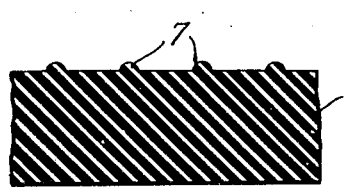
Fig. 4 is a transverse sectional view of a portion of a tube taken substantially along the section line IV—IV of Fig. 2.

Instead of utilizing raised ribs 5, 6 and 7 for defining the passageways, as shown in Figs. 1, 2 and 3, depressions may be used, as shown in Figs. 8, 9 and 10. In this modification a circumferentially extending passageway 14 is connected with laterally extending passageways 15 both of which are formed by depressed or indented portions of the tube. The indentations 14 and 15 are preferably of the same order of magnitude as the ribs 5, 6 and 7, that is the passageway 14 may be .025 of an inch deep and passageways 15 may be from .010 to .015 of an inch in depth. It is to be understood that the outer surface of an inner tube may be given an irregular or roughened surface by many other arrangements of ribs and/or depressed portions, the uses of which are contemplated within the present invention. Also the surface of the tube may be slightly roughened with interconnecting irregularly shaped elevations and depressions which collectively form suitable air passages. The irregular configuration is preferably given to the tube by cutting a suitable design in the surface of the mold sections used to cure such inner tubes. As previously stated, the central rib 5 may be formed by the flash at the meeting edges of such mold sections.

For some purposes a rubber valve stem 16, illustrated in Figs. 5 and 6, is utilized instead of the customary metallic valve stem. Such a valve stem is apt to completely close the rim opening 12 through which it extends. In order to permit the escape of air, one or more channels 17 may be provided down the outer face of the valve stem. The channels 17 may constitute continuations of passageways 19 in the body of the tube 20, and which extend beyond the area of the valve stem engaged by the rim through which the valve stem extends whereby the escaping air is vented through the rim. It is to be understood that additional openings can be provided in the rim on which the tire is mounted, if desired, but such additional openings are to be avoided if possible.

While I have shown and described certain present preferred embodiments of my invention, it is to be understood that it may be otherwise embodied within the spirit of the invention and the scope of the appended claims.

Having thus described my invention, what I claim and desire to protect by Letters Patent is:

1. A rubber valve stem for an inner tube having its outer surface provided with a passageway extending from its base to at least beyond the area normally engaged by a rim through which the valve stem extends.

2. A rubber valve stem for an inner tube having its outer surface provided with grooves extending from its base to at least beyond the area normally engaged by a rim through which the valve stem extends.

3. The combination with an inner tube having passageways for permitting the escape of air entrapped between the tube and a tire casing, of a rubber valve stem attached to said tube and having a passageway on its outer surface for conducting the escaping air through a rim opening.

4. An air valve for a pneumatic tire including a rubber stem, means disposed on the surface of the stem to permit free fluid passage of air past the exterior thereof.

5. In an air valve for a pneumatic tire, including a rubber stem of tapered cross section, means on the surface of the stem to permit free passage of air exteriorly of the stem comprising a plurality of ribs extending longitudinally of the stem.

6. In an air valve for a pneumatic tire, a tapered rubber stem portion, a base, means to permit free flow of air exteriorly of the stem including a plurality of projections on the stem and cooperating projections disposed on the base to provide air passages upon the surface of the valve.

7. A rubber valve stem for inner tubes such as used with pneumatic tires comprising a substantially flat base, a substantially tubular body secured to the base, said body being formed with a substantially cylindrical portion adjacent the base adapted to have a press fit in the hole of the rim upon which the tube is used, said base and tubular body being formed with surface configurations designed to allow the escape of air between the rim and the valve stem.

8. An inner tube including a valve stem vulcanized integrally thereto, means on the inner tube adjacent the valve stem, and means on at least the portion of the valve stem adjacent the tube for holding the inner tube and stem in such relation to a supporting rim that any air trapped between the tube and rim can escape.

9. An inner tube including a valve stem vulcanized integrally therewith, and means on at least the lower portion of the valve stem for holding the inner tube and stem in such relation to a supporting rim that any air trapped between the tube and rim can escape.

10. An inner tube having a valve stem secured thereto, said stem formed in part of its length and adjacent its connection to the inner tube of flexible elastic material, and means on the outer surface of said flexible part for permitting air trapped between the tube and rim to escape.

11. An air valve for an inner tube comprising a valve stem formed in part of its length and adjacent its connection to an inner tube of flexible elastic material, and means on the outer surface of said flexible part for permitting air trapped between the tube and rim to escape.

12. An air valve stem for an inner tube having its base adjacent its connection to an inner tube comprising a portion of flexible elastic material adapted to extend through and engage the walls of the valve stem opening of a tire rim and means on the engaging surface of said material for permitting air trapped between the tube and rim to escape.

13. The combination with an inner tube having minute passageways for permitting the escape of air entrapped between the tube and a tire casing past the bead portions of the casing, of a valve stem vulcanizably secured to the inner tube and having means for permitting the escape of air through a rim opening through which the valve stem is adapted to extend.

14. The combination with an inner tube having minute passageways for permitting the escape of air entrapped between the tube and a tire casing past the bead portions of the casing, of a valve stem integrally secured to the inner tube and having means communicating with said passageways for permitting the escape of air through a rim opening through which the valve stem is adapted to extend.

15. An air valve for a pneumatic tire comprising a stem, at least that portion which is disposed adjacent to an inner tube being of rubber composition, and means disposed on the outer surface of the rubber composition to permit free passage of air along said portion.

16. A valve stem for inner tube having an external surface thereof at the base of rubber composition, and means extending along the outer surface of the rubber base to permit free passage of air along the stem.

17. A valve stem for an inner tube having a rubber composition surface in the base portion normally extending through a rim opening, and one or more air passageways formed in and extending along the outer surface of said base portion.

18. A valve stem for an inner tube having a rubber composition surface in the area normally extending through a rim opening, and one or more grooves formed in said rubber surface to provide passageways for the flow of air therealong.

19. The combination with an inner tube having passageways for permitting the escape of air entrapped between the tube and a tire casing, of a rubber valve stem attached to said tube and having a groove on its outer surface for conducting the escaping air through a rim opening.

20. An inner tube having a valve stem secured thereto, said stem being formed in part of its length and adjacent its connection to the inner tube of flexible elastic material, and one or more grooves on the outer surface of said flexible part for permitting air trapped between the tube and rim to escape.

ERNST EGER.